(12) United States Patent
Honkala et al.

(10) Patent No.: US 6,850,778 B1
(45) Date of Patent: Feb. 1, 2005

(54) GATEWAY ARRANGEMENT

(75) Inventors: Hannu Honkala, Tampere (FI); Roy Mickos, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/558,008

(22) Filed: Apr. 24, 2000

(30) Foreign Application Priority Data

Apr. 30, 1999 (GB) .............................................. 9910113

(51) Int. Cl.⁷ .............................................. H04M 1/00
(52) U.S. Cl. .................... 455/560; 455/452.1; 455/516; 455/557; 370/535; 370/536; 370/537
(58) Field of Search ................. 455/560, 557, 455/450–452.2, 455, 516; 370/535, 536, 537, 538

(56) References Cited

U.S. PATENT DOCUMENTS

| 5,828,952 | A |   | 10/1998 | Sawyer |          |
|-----------|---|---|---------|--------|----------|
| 5,896,369 | A | * | 4/1999  | Warsta et al. | 370/338 |
| 5,949,775 | A | * | 9/1999  | Rautiola et al. | 370/338 |
| 5,956,331 | A | * | 9/1999  | Rautiola et al. | 370/252 |
| 6,292,657 | B1 | * | 9/2001  | Laursen et al. | 340/7.2 |
| 6,314,284 | B1 | * | 11/2001 | Patel et al. | 455/417 |
| 6,370,394 | B1 | * | 4/2002  | Anttila | 455/556 |
| 6,421,714 | B1 | * | 7/2002  | Rai et al. | 455/422 |

FOREIGN PATENT DOCUMENTS

| EP | 0 881 812 A2 | 12/1998 | |
| GB | 2315190 A | 1/1998 | |
| GB | 2315190 A * | 1/1998 | ........... H04L/12/66 |
| WO | 98/00986 | 1/1998 | |
| WO | 98/17048 | 4/1998 | |

* cited by examiner

Primary Examiner—William Trost
Assistant Examiner—Stephen D'Agosta
(74) Attorney, Agent, or Firm—Squire, Sanders & Dempsey L.L.P.

(57) ABSTRACT

Disclosed herein is a gateway arrangement for receiving first and second types of traffic. The arrangement includes first and second gateways. The first gateway is arranged to separate the first and second types traffic. The first type of traffic is output to the second gateway. The second gateway is arranged to extract information from the first type of traffic and output the extracted information to the first gateway. The first gateway has an output interface arranged to output the second type of traffic dependent upon the extracted information.

22 Claims, 4 Drawing Sheets

GATEWAY ARRANGEMENT

BACKGROUND OF THE INVENTION

1. Field of the Invention

The present invention relates to a gateway arrangement and in particular, but not exclusively to a gateway arrangement for use between two telecommunication domains.

2. Description of the Related Art

Known office based communication systems usually operate with fixed line telephone units within the office linked via an internal switch board or PBX (private branch exchange). Such fixed line systems are able to provide relatively high voice quality although users are not able to move for the duration of a call.

The advent of wireless cellular telecommunication technologies, an example of which is the GSM standard (Global System for Mobile communications), means that wireless systems can provide at least the equivalent voice quality as compared to fixed line systems. Wireless cellular systems also have the advantage that the user can move.

WIO "wireless intranet office" is a proprietary communication system which is being developed by the present applicants. This WIO system introduces the concept of utilizing mobile terminals, such as conventional GSM mobile stations, in an office environment. The system makes use of a known concept called internet telephony or voice-over-IP. (IP stands for internet protocol.)

Voice-over-IP allows audio, video and data information to be transmitted over the existing IP-based local or wide area networks or the internet. The technology thus provides for convergence and integration of the communication of three different data types over the same network.

Prior to the introduction of voice-over-IP, offices often operated three separate networks for the transmission of audio, video and data information. Fixed line telephone systems coupled to an in-house PBX provided voice communication. An office based local area network (LAN) or intranet (i.e. a packet switched internal network) having computer terminals linked via network cards and under the control of a server station provided for the transmission of "conventional" computer data. Video cameras linked to monitors via a fixed line or wireless link provided for video communications. With voice-over-IP, audio, video and data information can be transmitted simultaneously using the same packet-switched network or IP-router throughout the office environment and beyond the confines of the office.

In order to provide for such media convergence, voice-over-IP often uses a specific ITU (International Telecommunication Union) standard protocol to control the information flow over the intranet. One common standard protocol used in voice-over-IP systems, and the one used in the WIO system is termed H.323. H.323 is an ITU standard for multimedia communications (for example voice, video and data) and allows multimedia streaming over conventional packet-switched networks. The protocol provides for call control, multi media management and bandwidth management for both point-to-point (two end users in communication) and multipoint (three or more end users in communication) conferences.

The H.323 protocol is network, platform and application independent allowing any H.323 compliant terminal to operate in conjunction with any other terminal.

The H.323 standard defines the use of three further command and control protocols. H.245 is for call control and is responsible for control messages governing the operation of the H.323 terminal including capability exchanges, commands and indications. Q.931 is for call signalling and is used to set up a connection between two terminals. The RAS (Registrations, Admissions and Status) signalling function governs registration, admission and bandwidth functions between endpoints and gatekeepers. Gatekeepers will be discussed in more detail hereinafter.

For a H.323 based communication system, the standard defines four major components: terminals; gateways; gatekeepers; and multipoint control units (MCU).

Terminals are the user end-points on the network and can be a telephone mobile or fixed, a fax unit or a computer terminal. All H.323 compliant terminals must support voice communications and optionally video and data communications.

Gateways connect H.323 networks to other networks or protocols. For an entirely internal communications network, i.e. one with no external call facility, gateways are not required.

Gatekeepers are the control centers of the voice-over-IP network. It is under the control of a gatekeeper that most transactions (communications between two terminals) are established. The primary functions of the gatekeeper are address translation, bandwidth management and call control to limit the number of simultaneous H.323 connections and the total bandwidth used by those connections. An H.323 "zone" is defined as a collection of all terminals, gateways and multipoint-control units (MCU) which are managed by a single gatekeeper. Multipoint control units (MCU) support communications between three or more terminals. The MCU comprises a multipoint controller (MC) which performs H.245 negotiations between all terminals to determine common audio and video processing capabilities, and a multipoint processor (MP) which routes audio, video and data streams between terminals.

The conventional voice-over-IP system described hereinbefore normally utilizes standard fixed-line telephone systems which are subject to the disadvantages of a lack of mobility and a lack of user commands.

The WIO concept takes voice-over-IP further in that it provides for the use of conventional mobile terminals, such as GSM mobile stations, within the voice-over-IP system. To provide for such mobile communications within an intra-office communication network, the WIO system combines known voice-over-IP with the use of conventional wireless terminals within the voice-over-IP system. Those telephone units may be GSM mobile stations. This WIO concept may be in the context of a intra-office communication network.

Thus, in the WIO system intra-office calls to mobile stations are routed through the office intranet and external office calls are routed conventionally through the GSM network. Such a system provides most or all of the features supported by the mobile station and the GSM network such as telephone directories, short messaging, multiparty services, data calls, call barring, call forwarding etc. WIO thus provides for integrated voice, video and data communications by interfacing an H.323 based voice-over-IP network with a GSM mobile network.

The WIO system is a cellular network similar to the conventional GSM network and is divided into H.323 zones as discussed hereinbefore. One H.323 zone may comprise a number of cells. Two or more H.323 zones may be contained in an administrative domain. The allocation of H.323 zones to an administrative domain is an issue primarily concerning billing.

Gateways are provided between the WIO system and the normal cellular telecommunications system. These gateways have to deal with signalling traffic and payload traffic. It has been proposed to separate the traffic into the signalling and payload traffic and to pass the two types of traffic to separate gateways. However the interface between the gateways and, for example the normal cellular telecommunications system and the public service telephone network are relatively expensive. This proposal has the advantage that one signalling gateway is provided for a number of payload gateways. Alternatively, the same gateway can be used to process both signalling and payload traffic. However signalling and payload traffic have very different requirements, this can complicate the construction of the gateway. This is undesirable particularly since the quantity of payload traffic may be much greater than that of the signalling traffic.

Accordingly, it is an aim of embodiments of the present invention to address these problems.

SUMMARY OF THE INVENTION

According to one aspect of the present invention, there is provided a gateway arrangement for receiving traffic comprising a first type of traffic and a second type of traffic, said gateway arrangement comprising a first and a second gateway, said first gateway being arranged to separate the first and second types traffic, said first type of traffic being output to said second gateway, said second gateway being arranged to extract information from said first type of traffic and output said information to the first gateway, and said first gateway having an output interface which is arranged to output the second type of traffic in accordance with said extracted information.

As the first gateway has an output interface which is arranged to output the modified first type of traffic and second type of traffic, the number of interfaces can be reduced. The output interface may be in accordance with the ETSI E1 standard or may be any other suitable type of interface.

Preferably, the first and second gateways are connected to a connector and the first type of traffic is sent between the first and second gateways via said connector. The connector may be provided by a local area network.

In an alternative embodiment of the present invention, the first and second gateways are connected directly to each other.

The output interface of the first gateway may be arranged to be connected to a mobile telecommunications network. Alternatively, the first gateway may be arranged to be connected to a wired telecommunications network. The first gateway may have a second interface for connecting to the mobile telecommunications network.

Preferably, the output interface is also an input interface which is arranged to receive first and second types of traffic signals. In other words, the gateway arrangement may be bidirectional.

The first type of traffic may be signalling traffic whilst the second type of traffic may be payload traffic. The first gateway may be arranged to alter the coding of the second type of traffic whilst the second gateway may be arranged to alter the protocol of or decode the first type of traffic.

The first and second gateways may be connected via a wired or a wireless connection.

In a particularly preferred embodiment of the present invention, a plurality of first gateways are provided for one of the second gateways. These first gateways may be connected to respective ones of the mobile telecommunications network and the wired telecommunications network. In one embodiment of the present invention, eight of the first gateways are provided for the or each of the second gateways. Of course any other number of the first and second gateways can be provided.

According to a second aspect of the present invention, there is provided a gateway, said gateway being arranged to receive first and second types of traffic, said gateway comprising means for separating said first and second types of traffic; output means for outputting said first type of traffic to a second gateway for processing by said second gateway; input means for receiving said processed first type of traffic from said second gateway whereby the second type of traffic is output by said output means in accordance with the processed first type of traffic received from said second gateway.

BRIEF DESCRIPTION OF THE DRAWINGS

For a better understanding of the present invention and as to how the same may be carried into effect, reference will now be made by way of example only to the accompanying drawings in which.

DETAILED DESCRIPTION OF THE INVENTION

Figure 1:
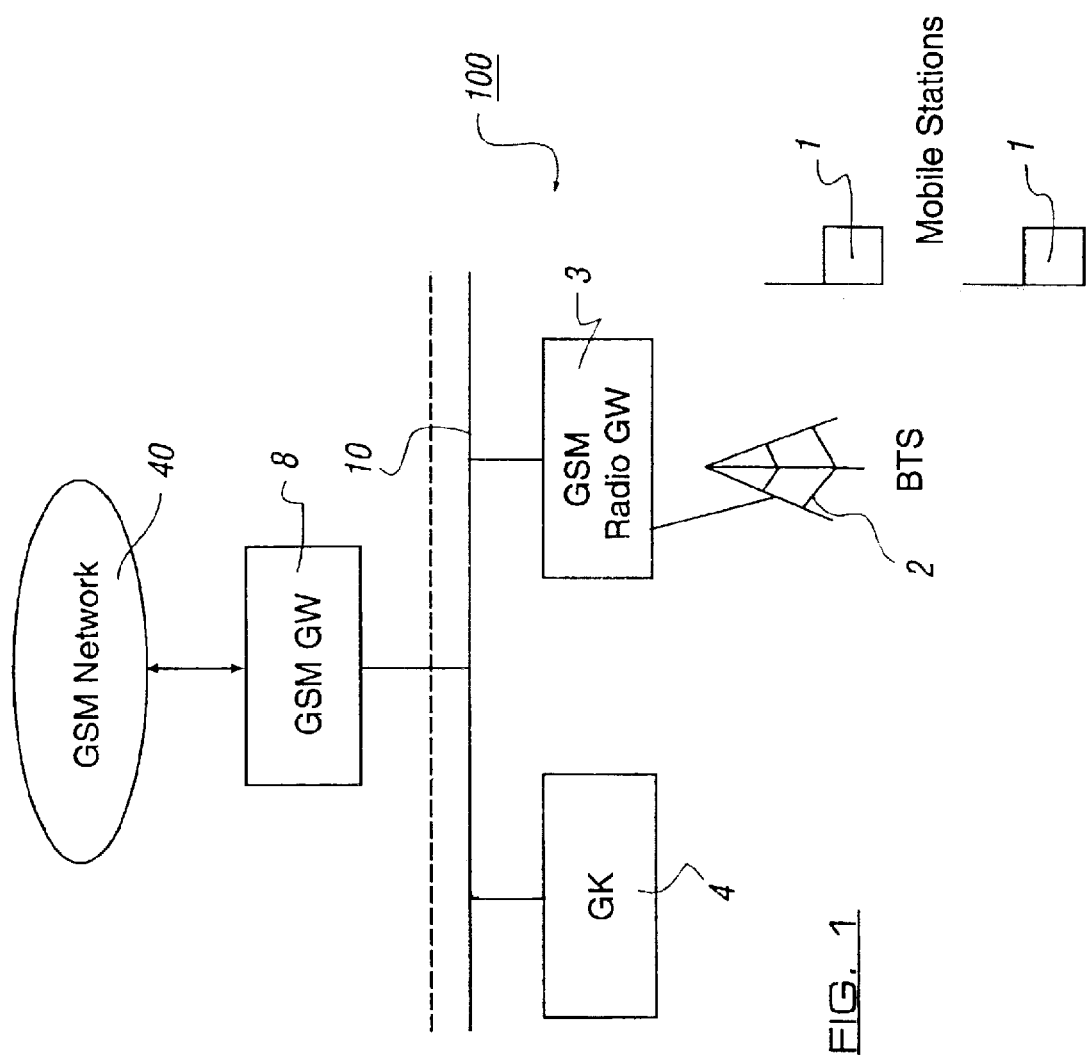
FIG. 1 shows a block diagram showing the components used in the implementation of the WIO system proposed by the applicant.

In the office environment 100, within which the WIO system is implemented, there is an IP based LAN (local area network) 10 operable to carry packet form data.

One or more mobile stations (MS) 1 communicate, i.e. transmit signals to and/or receive signals from, a base transceiver station (BTS) 2. The base transceiver station 2 used in the WIO system is similar to the base transceiver stations used in conventional GSM cellular communication systems in that the base station 2 is connected to, and operates in conjunction with, a controller. In a conventional GSM system, the controller is termed a base station controller (BSC). However, in the WIO system, the controller is represented by a GSM radio gateway 3, the function of which will be described hereinafter. The base transceiver station 2 therefore receives signals transmitted by the mobile station 1 and forwards them to the GSM radio gateway 3. The GSM radio gateway 3 is also connected to the IP-based LAN 10.

A WIO gatekeeper (WGK) 4 is connected to the IP-based LAN 10.

Connected to the IP-based LAN 10 is an interface, a GSM gateway (GSM) 8. The GSM gateway 8 is also connected to a standard GSM network 40 as used in a conventional mobile communication system. The WIO system allows for the use of mobile telephones in the office environment to make both internal and external office calls. The functions of each of the components of FIG. 1 will now be described in more detail.

The GSM radio access gateway 3 performs similar functions to that of a base station controller in a conventional GSM network such as the management of radio resources and channel configuration and the handling of the base transceiver station configuration. However, the GSM radio access gateway 3 also provides conversion from GSM voice data to packet based data suitable for transmitting on the packet based IP-based LAN 10.

The WIO gatekeeper 4 is the main controller of the WIO system. It is responsible for all of the functions which the H.323 protocol defines to its gatekeeper, including call management and call signalling. It is also responsible for mobility management. The WIO gatekeeper is able to manage the main different call types such as voice, data, facsimile and conference calls which can be established between a mobile station, a computer terminal and a normal telephone in any combination.

The GSM gateway 8 handles communication between the WIO environment and the mobile services switching center (MSC) of the GSM network. From the MSC viewpoint, the WIO appears to be a conventional base station controller. The GSM gateway 8 also provides isolation means for disconnecting the WIO system from the MSC in the event of WIO system failure.

The telephone calls managed by the WIO system can be divided into internal calls and external calls. Internal calls are those calls where both parties involved in the call are located within the WIO system and external calls involve a user who is not located within the WIO system.

Figure 2:
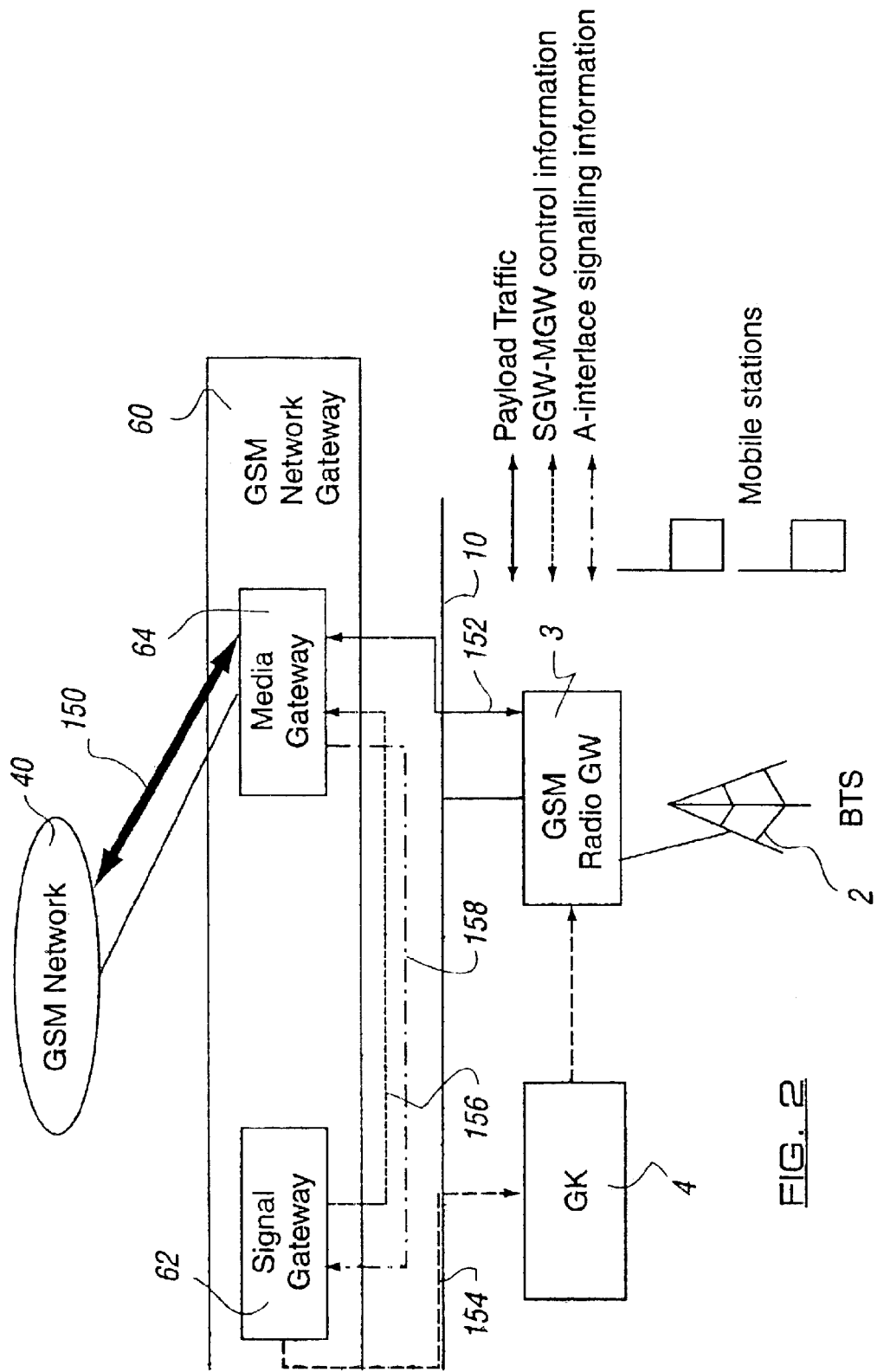
FIG. 2 is a modified block diagram to assist in the explanation of embodiments of the present invention.

The basic concept of the present invention will now be described in relation to FIGS. 2 to 4 which shows a modification to the WIO system of FIG. 1. In FIG. 2, the GSM gateway has been replaced by a GSM network gateway 60. The GSM network gateway comprises one signalling gateway 62 and a plurality of media gateways 64. For clarity, only a single media gateway is shown in FIG. 2. The media gateway 64 is connected to a telecommunications switch in the GSM network 40. The telecommunications switch may be provided in the mobile services switching center. The media gateway 64 and the telecommunications switch each have an E1 interface. The E1 interface can be seen from FIG. 3 which shows the media gateway 64 in more detail. The E1 interface is referenced 66. The media gateway 64 also has a LAN interface 68. Through this LAN interface 68, the media gateway 64 is able to communicate with the signalling gateway 62 and the GSM radio gateway 3.

The media gateway 64 is arranged to receive payload and signalling information from the telecommunications switch of the GSM network 40 via the E1 interface 66. The media gateway 64 separates the signalling information from the payload, terminates the lower signalling layers and forwards the upper layer signalling information to the signalling gateway 62. The signalling gateway 62 and media gateway 64 are, as mentioned hereinbefore, connected via the LAN 10. Accordingly, both the media gateway and the signalling gateway have a LAN interface 68 and 70 respectively which allow the signalling information to be sent from the media gateway 64 to the signalling gateway 62. The media gateway 64 alters the protocol of the signalling information received by the E1 interface 66 to a format in which it conforms to the protocol of the LAN.

The signalling gateway 62 is arranged to extract information from the signalling information received from the media gateway 64. In particular, the signalling gateway is arranged to decode the received signalling information to extract the information. This information includes the time slot for the associated payload and the IP address. This information is passed back to the media gateway 64 via the LAN interfaces 68 and 70 and the LAN 10. The main function of the signalling gateway is, however, to convert the upper layer signalling information (GSM A-interface information in this embodiment) to the protocol (H.323) used between the signalling gateway 62 and the gatekeeper 4, as well as between the signalling gateway 62 and the GSM radio gateway 3. This again involves a decoding operation.

The media gateway 64 converts the payload data into a format in which it can be transmitted to the GSM radio gateway 3 via the LAN 10. The payload will be in the time slot indicated by the signalling information and will be directed to the IP address of the GSM radio gateway 3 included in the signalling information.

As can be seen from FIG. 2, the payload passes from the telecommunications switch in the GSM network 40 to the media gateway (see arrow 150) and then via the LAN 10 to the GSM radio gateway 3 (see arrow 152). Signalling information will be passed from the signalling gateway 62 to the gatekeeper 4 (see arrow 154). Signalling information also passes from the media gateway 64 to the signalling gateway 62 (see arrow 158). Signalling information is passed from the signalling gateway 62 to the media gateway 64 (see arrow 156). The signalling gateway 62 decodes the signalling information which it receives before passing the decoded signalling information to the media gateway 64 and the gatekeeper 4. Information is passed from the gatekeeper 4 to the GSM radio gateway 3. This may be directly or via the LAN 10.

The payload signals may include data, voice or audio information. Signalling traffic may include signals relating to, for example, call set-up, paging, handover and breaking of connections.

Figure 3:
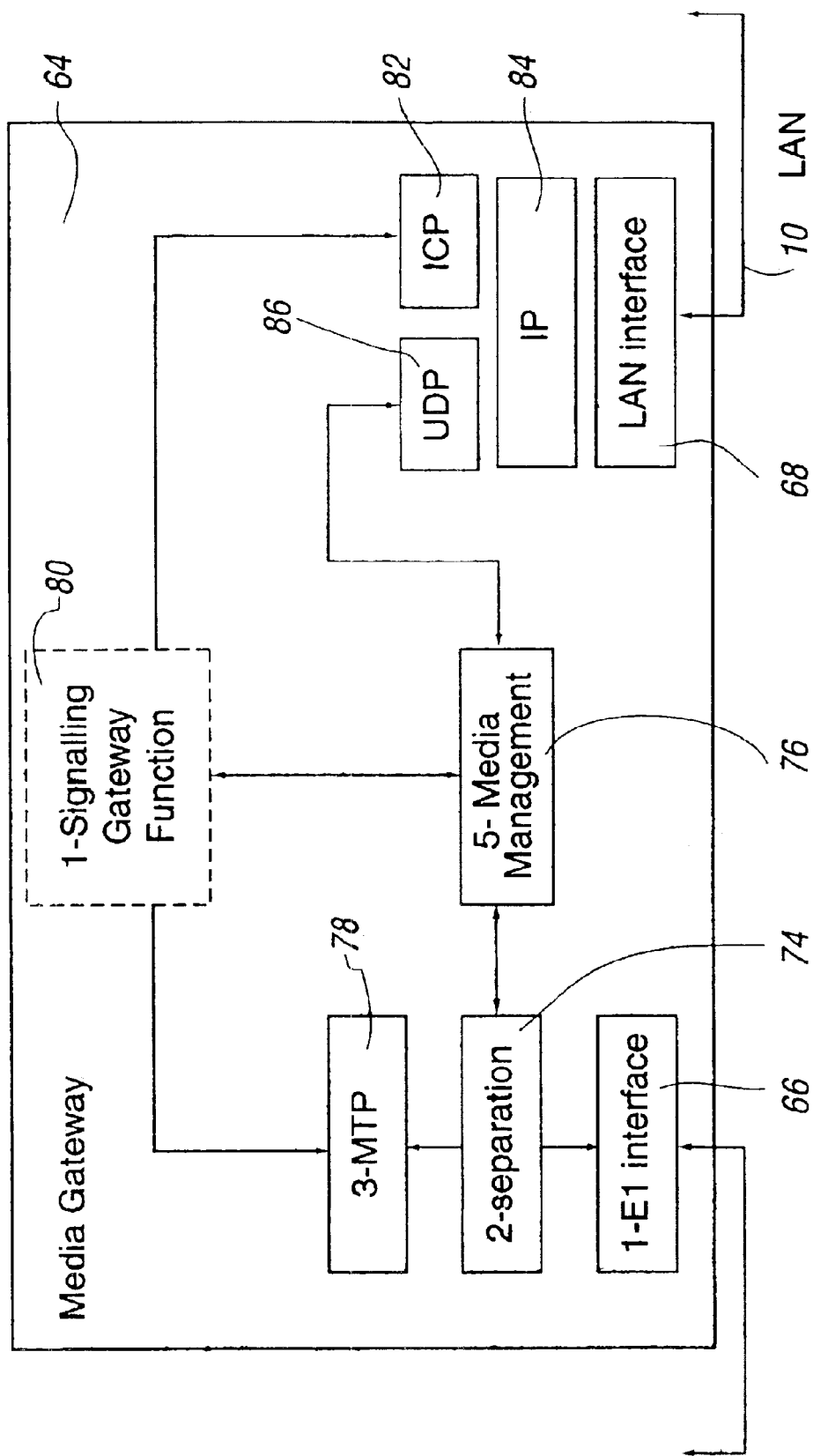
FIG. 3 shows a block diagram of the media gateway.

Reference will now be made to FIG. 3 which shows the media gateway in more detail. The E1 interface 66 is the physical connection to the E1 network. The separation layer 74 has a HDLC circuit (high level data link control) which is configured to catch signalling information carried in a certain time slot. The remaining information is passed to the media management layer 76. The separation layer 74 is connected to an MTP (message transfer protocol) signalling layer which is a normal telecommunications protocol layer in the SS7 (signalling system No 7 standard) standard. This layer is relevant for circuit switch connection and is terminated in the media gateway 64. The rest of the information is processed in a very light signalling gateway function 80. In other words, the upper layer signalling information is put on IP packets and sent by the IP stack function represented by the TCP (transmission control protocol) and IP layers 82 and 84 respectively. The media management function provided by layer 76 can, in some configurations, perform the transcoding (from one voice codec to another codec or the like) and also put media frames (received in a time slot via the E1 interface 66) into IP packets and send them to other media handling devices such as for example the GSM radio gateway 3. The IP address of the destination is received from the signalling gateway via the LAN interface 68, the IP layer 84 and 9 the UDP (user datagram protocol) layer 86. The TCP and UDP layers are part of a Internet Engineering Task Force standard.

Figure 4:
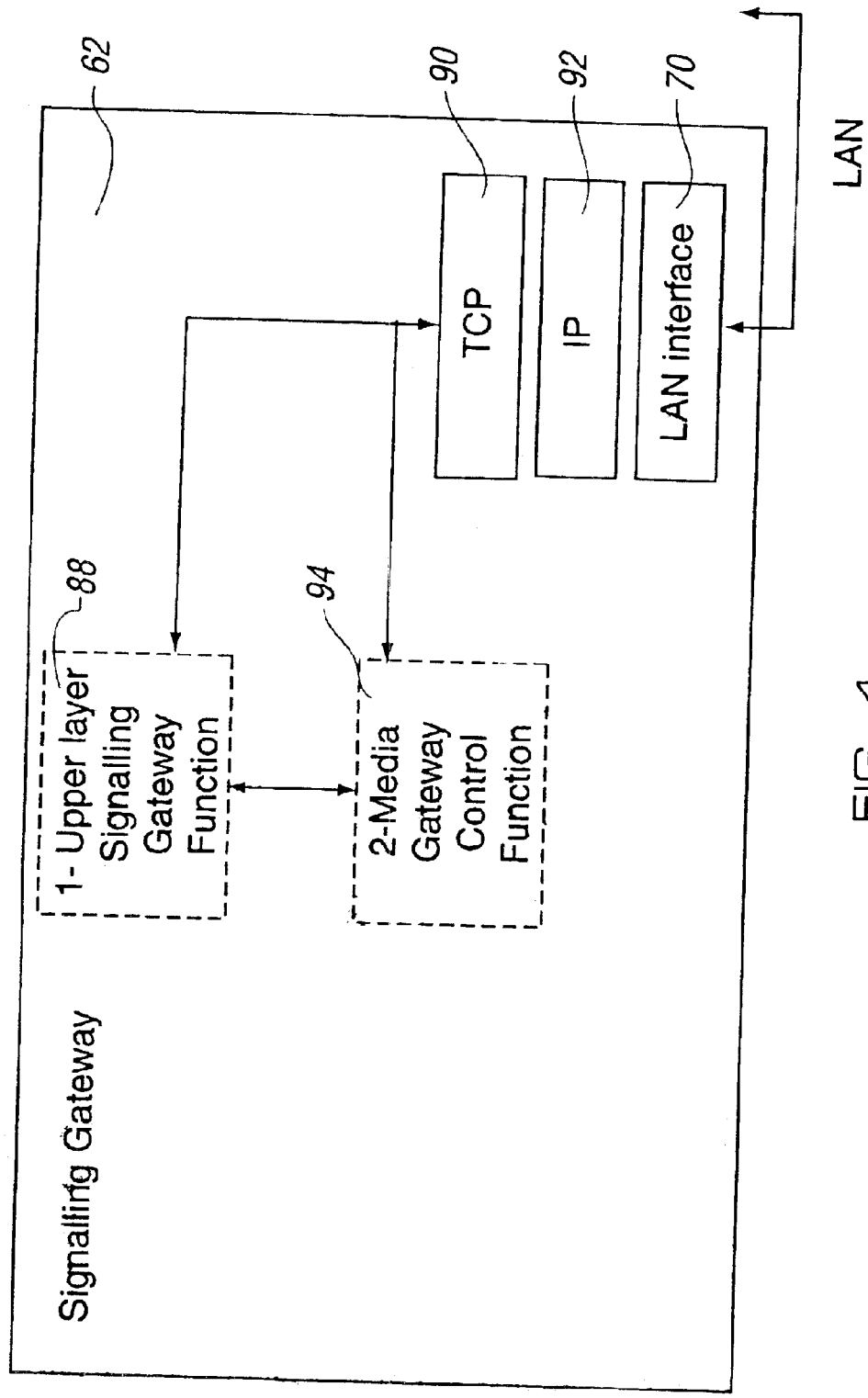
FIG. 4 is a block diagram of the signalling gateway.

Reference will now be made to FIG. 4 which shows the signalling gateway 62 in more detail. The signalling gateway 62 only has the LAN interface 70. Through this interface, the signalling gateway communicates with the gatekeeper 4 and the media gateways 64. The signalling information is received in the upper layer signalling gateway function layer 88 which converts the signalling to the format used in the WIO network. The lower layers, the TCP layer 90 and the IP layer 92 are the same in both the directions to and from the media gateway 64 and the gatekeeper 4. In the upper layer signalling gateway function layer, the upper layer information is converted.

A separate media gateway control function layer 94 is provided in the signalling gateway 62. This layer sends the relevant time slot/IP address information to the media gateway 64. The IP information is received from the gatekeeper 4 and the time slot information is received from the telecommunications network 40 via the media gateway 64.

It should be emphasised that in preferred embodiments of the present invention, a plurality of media gateways are provided for the or each signalling gateway.

The E1 interface is defined in a ETSI (European Telecommunications Standards Institute) telecommunication standard and uses pulse code modulation for the signals passing therethrough.

The same path can be used for signals from the LAN to the mobile switching center of the GSM network 40.

Whilst the embodiment of the present invention has been described in relation to the GSM gateway, the present invention is equally applicable to any similar gateway which handles signalling and media traffic.

Whilst the embodiment of the present invention has been described in the context of a SS 7 system, embodiments of the present invention are equally applicable to any other suitable standard. Likewise, the mobile telecommunications network need not be in the GSM standard but can be in any other suitable standard. Embodiments of the present invention are applicable to fixed networks as well as wireless networks.

In embodiments of the present invention, one signalling gateway is provided for eight media gateways. The ratio of signalling to the media gateways may of course have any suitable value. The media gateways may be all for the GSM network or may be for another type of network or a mixture thereof. One 64 Kbps signalling channel can handle the signalling information for about 300 voice channels.

In E1 format, one frame might include 32 time slots or channels. Typically the first slot will carry synchronising information. This synchronising information allows the signalling and payload traffic which is ultimately output by the E1 interface to be synchronised with respect to the other. This is preferred but not essential. One (or more than one) slot is used for signalling and the remaining slots will be used for 64 Kbps media traffic.

The signalling gateway is preferably implemented using suitable software. However, embodiments of the present invention may be implemented in hardware. Likewise, the media gateways may also be implemented in hard or software. The media gateway has E1 interface cards on which the lowest protocol layers can be implemented in any suitable way.

Whilst the media gateways, signalling gateway and IP LAN are connected by wire, alternative embodiments of the invention may use wireless connections. Embodiments of the connection may alternatively use a mixture of wired and wireless connections.

What is claimed is:

1. A gateway arrangement for receiving traffic comprising a first type of traffic and a second type of traffic, the gateway arrangement comprising a first gateway and a second gateway, the first gateway being arranged to separate the first and second types traffic, the first type of traffic being output to the second gateway, the second gateway being arranged to extract information from the first type of traffic and output the information to the first gateway, and the first gateway having an output interface which is arranged to transmit the second type of traffic dependent upon the extracted information,
   wherein the output interface is also an input interface which is arranged to receive first and second types of traffic signals, the first type of traffic is signaling traffic and the second tune of traffic is payload traffic.

2. The arrangement according to claim 1, wherein the first and second gateways are connected to a connector and the signaling traffic is sent between the first and second gateways via the connector.

3. The arrangement according to claim 2, wherein the connector is provided by a local area network.

4. The arrangement according to claim 1, wherein the first and second gateways are connected directly to each other.

5. The arrangement according to claim 1 wherein the first gateway is arranged to be connected to a mobile telecommunications network.

6. The arrangement according to claim 5, wherein the first gateway has a second interface for connecting to said mobile telecommunications network.

7. The arrangement according to claim 1, wherein the first gateway is arranged to be connected to a wired telecommunications network.

8. The arrangement according to claim 1, wherein the first and second gateways are connected via a wired connection.

9. The arrangement according to claim 1, wherein the first and second gateways are connected via a wireless connection.

10. The arrangement according to claim 1, wherein a plurality of first gateways are provided for the second gateway.

11. The arrangement according to claim 10, wherein eight of the first gateways are provided for the second gateway.

12. The arrangement according to claim 1, wherein the first gateway is arranged to alter the coding of the payload traffic.

13. The arrangement according to claim 1, wherein the second gateway is arranged to alter the protocol of the signaling traffic.

14. The arrangement according to claim 1, wherein the output interface is in accordance with ETSI E1 standard.

15. The arrangement according to claim 1, wherein the gateway arrangement is provided between a GSM environment and an IP environment.

16. The arrangement according to claim 1, wherein the extracted information is at least one of time slot and address information.

17. The arrangement according to claim 1, wherein the gateway arrangement further comprises a plurality of second gateways.

18. A gateway arranged to receive first and second types of traffic, the gateway comprising:
   means for separating the first and second types of traffic;
   means for outputting the first type of traffic to a second gateway for processing by the second gateway;
   means for receiving a processed first type of traffic from the second gateway, whereby the second type of traffic is transmitted by the means for outputting dependent upon the processed first type of traffic received from the second gateway,
   wherein the means for outputting is also means for inputting which is arranged to receive first and second types of traffic signals, the first type of traffic is signaling, traffic and the second type of traffic is payload traffic.

19. A gateway arrangement for receiving traffic comprising a first type of traffic and a second type of traffic, the gateway arrangement comprising a first gateway and a second gateway, the first gateway being arranged to separate the first and second types traffic, the first type of traffic being output to the second gateway, the second gateway being arranged to extract information from the first type of traffic arid output the information to the first gateway, and the first gateway having an output interface which is arranged to transmit the second type of traffic dependent upon the extracted information, wherein eight of the first gateways are provided for the second gateway.

20. A gateway arrangement for receiving traffic comprising a first type of traffic and a second type of traffic, the gateway arrangement comprising a first gateway and a second gateway, the first gateway being arranged to separate the first and second types traffic, the first type of traffic being output to the second gateway, the second gateway being arranged to extract information from the first type of traffic and output the information to the first gateway, and the first gateway having an output interface which is arranged to transmit the second type of traffic dependent upon the extracted information, wherein the first gateway is arranged to alter the coding of the payload traffic and the second gateway is arranged to alter the protocol of the signaling traffic.

21. A gateway arrangement for receiving traffic comprising a first type of traffic and a second type of traffic, the gateway arrangement comprising a first gateway and a second gateway, the first gateway being arranged to separate the first and second types traffic, the first type of traffic being output to the second gateway, the second gateway being arranged to extract information from the first type of traffic and output the information to the first gateway, and the first gateway having an output interface which is arranged to transmit the second type of traffic dependent upon the extracted information, wherein the output interface is in accordance with the ETSI E I standard and the extracted information is at least one of time slot and address information.

22. A, gateway arrangement for receiving traffic comprising a first type of traffic and a second type of traffic, the gateway arrangement comprising a first gateway and a second gateway, the first gateway being arranged to separate the first and second types traffic, the first type of traffic being output to the second gateway, the second gateway being arranged to extract information from the first type of traffic and output the information to the first gateway, and the first gateway having an output interface which is arranged to transmit the second type of traffic dependent upon the extracted information, wherein the gateway arrangement is provided between a GSM environment and an IP environment and the extracted information is at least one of time slot and address information.

* * * * *